US006130621A

United States Patent [19]
Weiss

[11] Patent Number: 6,130,621
[45] Date of Patent: Oct. 10, 2000

[54] METHOD AND APPARATUS FOR INHIBITING UNAUTHORIZED ACCESS TO OR UTILIZATION OF A PROTECTED DEVICE

[75] Inventor: Kenneth P. Weiss, Newton, Mass.

[73] Assignee: RSA Security Inc., Bedford, Mass.

[21] Appl. No.: 08/300,703

[22] Filed: Sep. 2, 1994

Related U.S. Application Data

[63] Continuation of application No. 07/911,208, Jul. 9, 1992, abandoned.

[51] Int. Cl.[7] .................... H04Q 1/00

[52] U.S. Cl. .................... 340/825.31; 70/280; 312/319.8; 312/333

[58] Field of Search .................... 340/825.31, 825.34; 70/267–271, 280, 78, 85, 88, 87, 339; 312/319.6, 319.8, 215, 333; 49/30, 35

[56] References Cited

U.S. PATENT DOCUMENTS

| | | | |
|---|---|---|---|
| 2,185,763 | 1/1940 | Lisle | 312/319.8 |
| 2,614,020 | 10/1952 | Collins | 312/319.6 |
| 3,337,992 | 8/1967 | Tolson | 340/825.31 |
| 4,035,792 | 7/1977 | Price | 70/87 |
| 4,366,595 | 1/1983 | Elliott | 49/30 |
| 4,426,639 | 1/1984 | Jessup | 49/30 |
| 4,803,902 | 2/1989 | Mauer | 70/339 |
| 4,885,778 | 12/1989 | Weiss | 340/825.31 |
| 4,887,205 | 12/1989 | Chou | 49/30 |
| 4,988,992 | 1/1991 | Heitschel | 340/825.31 |
| 5,023,908 | 6/1991 | Weiss | 340/825.31 |
| 5,087,107 | 2/1992 | Fumanelli | 312/333 |
| 5,097,505 | 3/1992 | Weiss . | |
| 5,196,841 | 3/1993 | Harder | 340/825.31 |
| 5,223,829 | 6/1993 | Watabe | 340/825.31 |
| 5,225,825 | 7/1993 | Warren | 340/825.31 |
| 5,231,272 | 7/1993 | Mardon | 340/825.31 |

FOREIGN PATENT DOCUMENTS

| | | |
|---|---|---|
| 0 311 112 | 7/1988 | European Pat. Off. . |

*Primary Examiner*—Brian Zimmerman
*Attorney, Agent, or Firm*—Testa, Hurwitz & Thibeault, LLP.

[57] ABSTRACT

A method and apparatus for inhibiting unauthorized access to or utilization of a container or other protected device wherein a free standing lock or other control is provided, the state of which may be varied in response to receipt of a dynamic non-predictable code. The device may be a lock which when in a first state locks the container or other device, but which may switch to an unlocked state in response to verification that an authorized dynamic non-predictable code has been received. Alternatively, the control may be a mechanism integrally formed with the protected device which, when in a first state, inhibits and prevents normal operation of the device, permitting such operation when the mechanism is in its second state. The non-predictable code may be produced by a token carried by an authorized user, may involve query response operations, or may otherwise be generated in manners known in the art.

2 Claims, 4 Drawing Sheets

METHOD AND APPARATUS FOR INHIBITING UNAUTHORIZED ACCESS TO OR UTILIZATION OF A PROTECTED DEVICE

This application is a continuation of application Ser. No. 07/911,208, filed Jul. 9, 1992, now abandoned.

FIELD OF THE INVENTION

This invention relates to a method and apparatus for inhibiting unauthorized access to or utilization of a protected free standing device, and more particularly to a method and apparatus for limiting access to a container or other device (hereinafter referred to as "container") to authorized individuals or for permitting utilization of a protected device only under selected circumstances.

BACKGROUND OF THE INVENTION

There are many situations where it would be desirable if a particular device could be protected such that it could be accessed and/or utilized only by individuals authorized to do so at the particular time. For example, there are many industrial, government and other applications where a safe, file cabinet, desk drawers or other container may store information and material for which it is desired that access be limited to a select group of authorized individuals. Further, while during some hours, such as normal business hours, it may be desirable that a larger group of individuals be granted access, at other times, such as during non-business hours, on weekends and on holidays, it may be desirable that access be limited to a much smaller group. In addition, where an organization is operating with different shifts, it may be desirable to grant authorization for access to certain individuals during certain hours and to a different group of individuals during other hours, with a third more limited group of individuals being granted access during non-business hours. There may be some overlap of the individuals in the various groups. It is also desirable that the system be able to react quickly to changes in authorized individuals to reflect the hiring and firing of authorized persons, authorized persons being on vacation, and other changes in authorized personnel; and it is also desirable that the individuals being granted access at particular times be easily altered to reflect changes in work shifts and security status. In short, it is desirable that such systems provide full programmability of authorized individuals in a simple manner which may be quickly implemented.

Further, for high security applications, a "two-man/N-man" rule may be applied, with access to a safe, file cabinet, other container like device being granted only when appropriate inputs are received from two or more authorized individuals (hereinafter "N-man rule"). The same flexibility indicated above is desirable where an N-man rule is utilized as where only a single authorized individual is granted access to the container. In particular, the system should provide full programmability in determining combinations of individuals who will be permitted access to the container.

In addition to the above, it is desirable that such a system provide a complete audit trail of accesses to the container, including the individual or individuals granted access, the time such access was granted, and the time the container was relocked. Further, while relocking may be performed by the individual having access to the system, in some applications it may also be desirable that the system automatically relock after some time period to assure that a user does not inadvertently leave the container unlocked. It is also desirable that a central control be provided for all containers in a particular facility, or portion thereof, which central facility maintains audit trail records, updates and amended authorizations to the system and which, when an emergency or other unusual circumstance arises, can react quickly to change authorizations or prevent any access to the container. Such an unusual circumstance might, for example, be where it is determined that there has been a security breach at the facility.

In some applications, particularly where there is a time relock and/or a capability for relocking the container remotely from a central control, it is desirable that it also be possible to close the container (for example, close the drawer of a file cabinet) so that the container can be locked. Where such capability exists, it would also be desirable if the container could also automatically be opened when it is unlocked. Further, in some applications, it is desirable that the above capabilities exist on a drawer-by-drawer basis for a file cabinet. It is also desirable that, while there be central control, each individual container have its own free standing locking system. Free standing shall mean, for purposes of this invention, that the locking system or mechanism, or other protection mechanism, is not connected by wires or other electrical connectors to a central computer. RF or other electromagnetic communication or other non-wired links may however be permitted.

Finally, it is desirable that the security of such a system be enhanced by providing at least two factor security. There are currently three factors which are utilizable in security applications. The most common of these is what an authorized individual secretly knows, for example, a personal identification code (PIN). The second factor is something the person has, for example, a token, key or card. An example of this is the card utilized to gain access to bank ATM systems. The third possible factor is something the person is, for example a fingerprint, a voice signature or the like. For enhanced security, a system for granting access to a container should utilize two or more such factors, for example, something the person secretly knows and something the person has.

While currently existing security systems, devices and methods for containers, such as combination locks, may provide certain ones of the objectives indicated above, some of these objectives are not provided by any currently existing free standing, independent security method or apparatus for a container, and no currently existing container security method or apparatus provides all or a substantial portion of such objectives. A need therefore exists for improved container security method and apparatus adapted for providing the various objectives indicated above.

Another situation in which a need exists for an improved security method and apparatus is in the protection of devices which are subject to theft, unauthorized use or other misappropriation. One way to discourage such theft or misappropriation is to assure that the device, if misappropriated, will become useless to the misappropriator. Thus, if a car on being stolen has its entire ignition system disabled such that it cannot be driven, or has its wheels locked such that they cannot be moved even by a standard tow truck, it becomes of little value to a thief. Similarly, if a radio, computer, or other electronic device has a major component disabled such that it either is inoperative or generates useless noise if misappropriated, then there is little incentive for such misappropriation.

There are three possible modes in which such a method or apparatus might operate. The first mode is a turn-on mode wherein some type of security code is required in order for the device to be used at all. Thus, a coded input may be provided to enable or turn on a cable TV box at a subscriber site. The second mode is a turn-off mode wherein, when it is discovered that the device has been misappropriated, or when a period of authorized use has expired, the device may be disabled so that it is no longer usable. This mode is sometimes more convenient in that it does not require the rightful owner to input a code in order to normally use the device while still permitting the device to be disabled and rendered of no value to a misappropriator if the device is stolen. A third possible mode is a "keep-alive" mode wherein the device requires periodic receipt of coded input in order to remain operative, and stops operating if such a coded input is not received for some period of time. In some applications, number of uses or some other factor(s) may be substituted for time in keep-alive mode. Two or more modes may also be employed in some applications.

Again, it is desirable that such coded input be a two factor input to assure a higher security level. In very high security applications, where, for example, it is desired to wipe clean the memory of a stolen computer of all data and programs contained therein, the availability of N-man rule for turn-off (i.e. erase) mode might also be desirable.

Since a method and apparatus for providing such device security does not currently exist, it is a further object of the invention to provide an improved method and apparatus having such device security capabilities.

SUMMARY OF THE INVENTION

In accordance with the above, this invention provides a method and apparatus for inhibiting unauthorized utilization of a protected device such as a container, computer or other mechanism. Where the device is a container or similar item (hereinafter "container"), a locking mechanism may be provided for permitting access to the container by only one or more authorized individuals. Such mechanism might include a lock for the container with a means for releasing the lock to permit access. The means for releasing might include a token in the possession of each authorized individual for generating a time varying, or other non-predictable code. When an authorized individual desires access to the container, a personal code for the individual is inputted. Depending on the system, the current non-predictable code may then be inputted, or this code may be inputted when developed in response to a standard query/response procedure. In response to the received non-predictable and personal codes, the individual is identified and verification is provided that the individual is authorized to have access to the container. In response to such verification, the container lock is released. The mechanism preferably includes a self-contained or free standing processor and memory and apparatus for transferring data into and out of such memory. For the preferred embodiment, data is transferred into and out of the device through an infrared, RF or other I/O module, with the device containing a means responsive to output signals from the I/O module for storing data in the memory. The mechanism may also include means responsive to an interrogation signal from the module for converting at least selected data stored in the memory to infrared, RF or other appropriate signals which may be received by the I/O module. Data may also be transferred to the device via a remote transmitter, with the device containing a corresponding receiver.

Where two or more authorized individuals are required for access to be permitted to the container, the current non-predictable codes for all individuals, and when appropriate the secret or public personal codes for the individuals, are received, with verification being signified only if both individuals are verified. The apparatus preferably contains a processor which is programmable to vary the individuals permitted access to the container and to vary the time periods during which such individuals are granted access. The memory for the processor should also include a facility for maintaining an audit trail of accesses to the container which audit trail preferably identifies at least the time the lock is released, the time the lock is relocked, and the individual accessing the container. Where the container has separate draws, it is preferable in some applications that access to such draws be individually controlled and/or that separate audit trails be maintained for each drawer.

A means may also be provided for relocking a drawer after a particular time period has elapsed since the container was accessed. A suitable means may also be provided for automatically opening the container and for closing the container under certain circumstances, such as the passing of the predetermined time period.

Alternatively, the mechanism may include control means connected as an integral part of the device, which control means may be in at least a first and a second state, the control means being connected to the device in a manner such that the control means inhibits utilization of the device for its intended function when the control means is in its first state and does not inhibit utilization of the device when the control means is in the second state. A receiver for signals of a particular wave length is also provided which receiver is adapted to receive a time varying, non-predictable code selectively transmitted from a control source. Where it is determined that a received non-predictable code is for the particular device, the state of the control means is controlled in a predetermined way. The control means may for example be switched to the second state in response to an input permitting the device to be utilized, or may be switched to the first state in response to a control input inhibiting the utilization of the device. The control means may also include a time-out device of a selected duration or responsive to other criterion which time-out device may reset each time a verified input is received. If the time-out device is not reset before it times out, the control means is switched to the first state to inhibit operation.

The foregoing and other objects, features and advantages of the invention will be apparent from the following more particular description of preferred embodiments as illustrated in the accompanying drawings.

IN THE DRAWINGS

DETAILED DESCRIPTION

Figure 1:
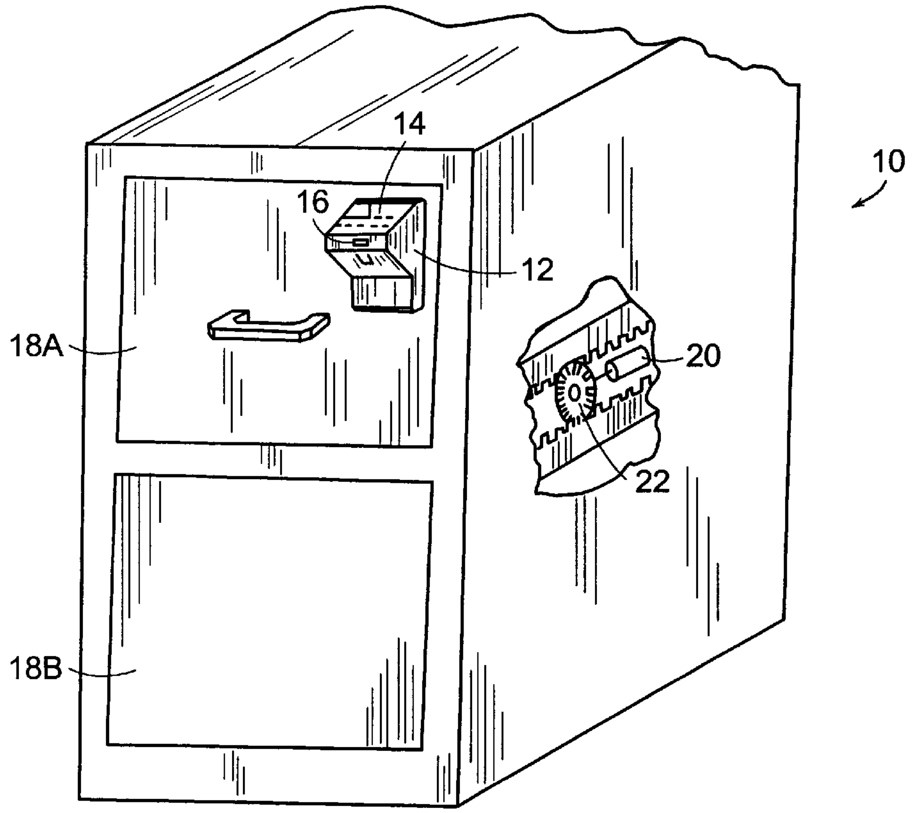
FIG. 1 is a partially cutaway front, top, right-side perspective view of a two-drawer file cabinet incorporating the teachings of this invention.

FIG. 1 shows a two-drawer file cabinet 10 which has mounted thereto a locking mechanism 12 in accordance with a preferred embodiment of the invention. Locking mechanism 12, the elements of which are shown in schematic form in FIG. 4, has an input area 14 which, for the preferred embodiment of the invention, is a numeric key pad. Other forms of input devices known in the art might also be utilized with the locking mechanism. The locking mechanism also has an input area 16 which, for the preferred embodiment, is the infrared receivers and generators of an infrared I/O unit. The elements of the input area 16 will be described in greater detail in conjunction with the description of FIG. 4. The basic elements of locking mechanism 12, including the input keypad and infrared I/O capability may be the same as in a locking mechanism available from OSI Security Devices of Sunnyvale, Calif.

File cabinet 10 may have any number of drawers, with two drawers 18A and 18B being shown in FIG. 1 for purposes of illustration. Locking mechanism 12 preferably controls both drawers 18. The locking mechanism may simultaneously release both drawers in response to an authorized input or the mechanism may determine that a given individual is to have access to only a single one of the drawers, with the other drawer remaining locked.

FIG. 1 also illustrates another feature of the invention wherein a motor 20 is provided which is controlled in a manner to be described later from locking mechanism 12 to, for example, drive a gear 22 which interfaces with a suitable rack mechanism on a drawer 18 to automatically open or close the drawer. For preferred embodiments, a separate gear 22 is provided for each drawer. Where the drawers are independently controllable, it may be necessary to also provide a separate motor 20 for each drawer or to provide a controllable clutch mechanism for each drawer.

Figure 2:
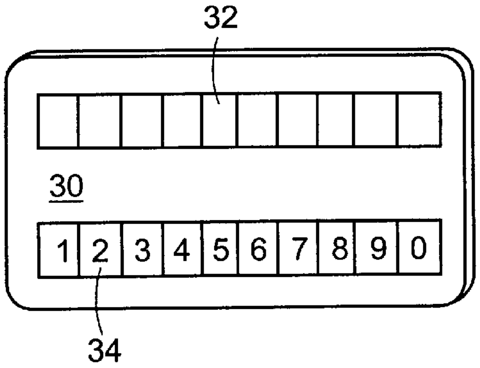
FIG. 2 is a front perspective view of a user card suitable for use in practicing the teachings of this invention.

FIG. 2 shows a card or token 30 which may be issued to authorized individuals. As is described in greater detail in U.S. Pat. Nos. 4,720,860; 4,885,778; 4,856,062; and 5,023,908 such a card or other ID token may, for example, contain a processor and a clock, the processor starting with a seed unique to each individual and running a randomization routine which either uses the seed and the current time, at for example one minute intervals, to generate a non-predictable number or starts at a known time with the seed and changes the seed at regular intervals in accordance with the program algorithm, for example, at one minute intervals, with the seed generated at the last interval or a value related to or derived therefrom, being used for the succeeding interval. The number stored on the card at each time interval, a subset of the stored number or a number derived from the stored number or otherwise related thereto appears on a liquid crystal, LED or other suitable display 32. For purposes of illustration, the display is shown as containing a nine digit number; however, this number may vary with application depending on the degree of security desired and the number of people utilizing the system.

For an embodiment of the invention to be described later, it may also be necessary to key a secret PIN (personal identification number) or other value into card 30. A numeric pressure-sensitive key pad 34 may be provided for this purpose. Details of one way in which the inputted PIN may be utilized to modify the non-predictable number, and the operation of the card 30 in general, may be obtained from the patents indicated above and in particular U.S. Pat. No. 5,023,908. An inputted PIN may also be used in other ways including as at least part of an encryption key or to modify such key.

Figure 3:
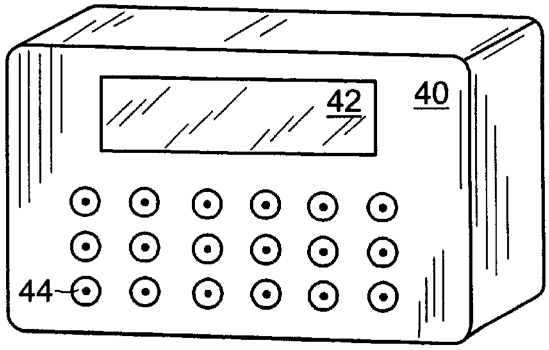
FIG. 3 is a front perspective view of an infrared I/O device which may be utilized with the apparatus of this invention.

FIG. 3 illustrates an I/O module 40 which may be utilized to transfer information into locking mechanism 12, for example, adding or changing individuals authorized to use file cabinet 10, and may also be utilized to obtain audit trail information or other information from mechanism 12 via I/O area panel 16. Module 40 has an infrared panel 42 which is the same as infrared panel 16 and which may contain infrared light-emitting elements which are selectively illuminated to transmit data and infrared light-detecting elements to detect infrared coded signals transmitted thereto. Information may be loaded into unit 40 either by holding panel 42 adjacent panel 16 when locking mechanism 12 has information to transmit, by holding panel 42 adjacent to a corresponding panel on the I/O module of a main computer, or by keying information into module 40 by use of keys 44. Keys 44 may include a transmit/receive switch or key, one or more other special function keys or switches, and selected numeric and/or alpha keys as required. Infrared I/O modules of this type are known in the art and are available, for example, from Videx. A Videx infrared transmitter/receiver would be suitable for this application. While for purposes of illustration, an infrared I/O module is disclosed for the preferred embodiment, an RF module or other module adapted to perform the function may be utilized.

Figure 4:
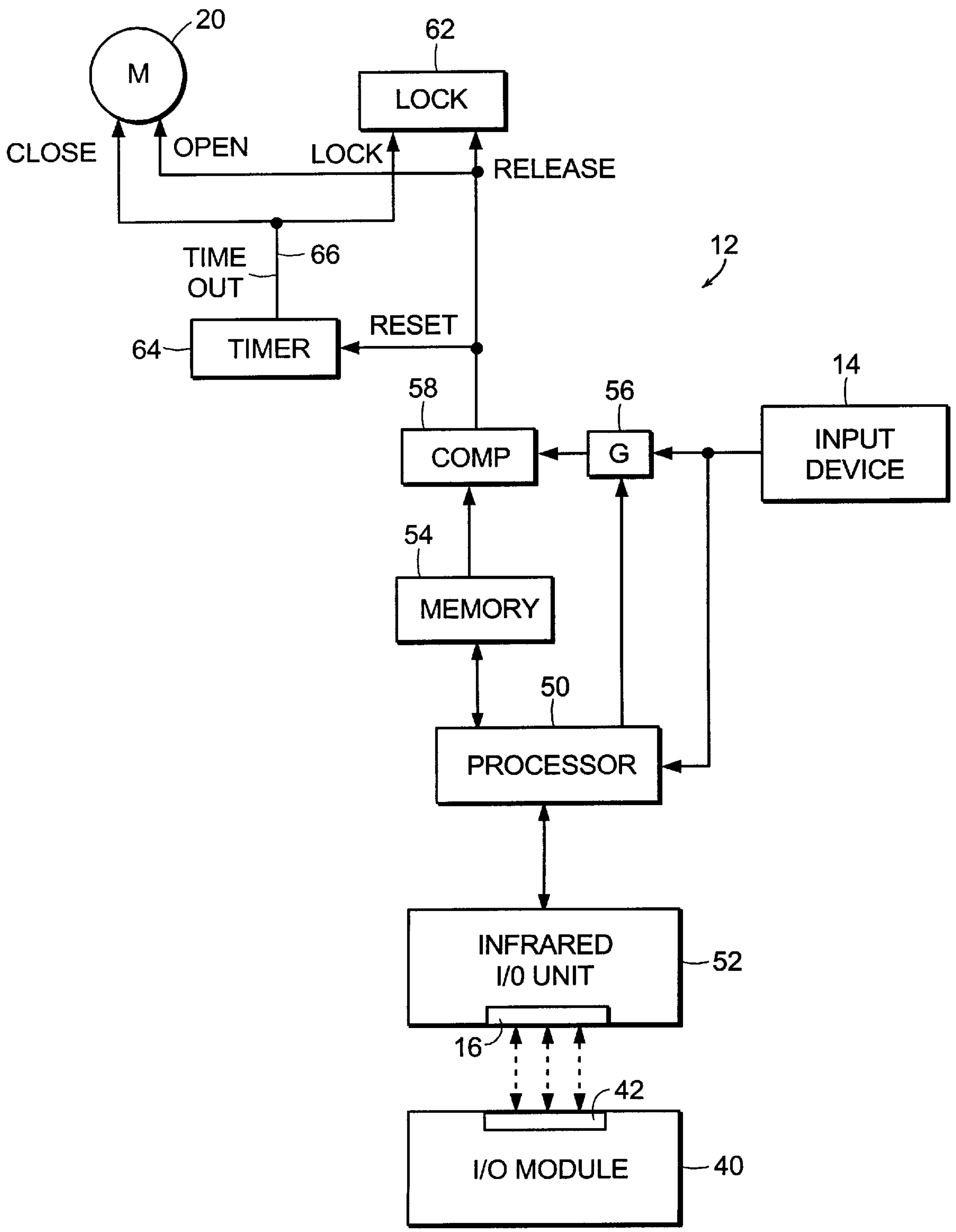
FIG. 4 is a block schematic diagram of a container locking mechanism in accordance with a preferred embodiment of the invention.

Referring now to FIG. 4, it is seen that locking mechanism 12 includes a processor 50 which may, for example, be a standard microprocessor. Processor 50 receives inputs from infrared (or other) I/O unit 52 and from keyboard or other input device 14. Infrared I/O unit 52 receives inputs from I/O module 40 through infrared panel 16. As previously indicated, panel 16 may include infrared light emitting and infrared light receiving elements. Processor 50 also receives inputs from memory 54 and stores inputs received from I/O unit 52 and input device 14 in memory 54.

Typically, there will be a selected group of individuals who are permitted access to drawers 18 of file cabinet 10. The unique starting codes or seeds which are stored in user device 30 for each user are also stored in processor 50 when the individual is to be granted access to the system. Where the starting seed for each non-predictable code determination is changed to the output or an intermediary value after each non-predictable code is generated, the time at which the original starting code or seed was stored for each user device is also stored in the computer. Particularly where the individual has had the card for some time, a current code value for the individual along with the time at which such code is current may be entered in memory 54 for the individual. For example, the stored code at the computer may be automatically updated daily at off hours, so that the stored coded value is never more than one day behind.

Since the number of individuals permitted access to a given cabinet 10 will generally be relatively few, the system may use the inputted information and the known algorithm to determine the nonpredictable code for each individual at the current time interval. Thus, the current non-predictable code for each individual authorized to have access to cabinet 10 may be determined when an access request is made. Alternatively, the individual seeking access may identify himself to the computer with a secret or non-secret code, causing only the nonpredictable code for the identified individual to be generated and utilized to verify the individual.

The inputs from input device 14 are also applied as the information input to gate or gates 56. When processor 50 determines that a non-predictable code is being inputted, it enables gate 56 to apply inputs to comparator 58 and also enables memory 54 to generate an appropriate output.

Depending on the mode of operation for the device, memory 54 may apply only the code for an identified individual to comparator 58, this being basically a verify mode to assure that an individual who has identified himself with his PIN or other input code is, in fact, the individual he alleges to be. Alternatively, the coded input for the individual may be stored in device 14 and successively compared against current coded values for authorized individuals stored in memory 54 until a match is found. Since processor 50 knows the individual associated with each code applied to comparator 58, a successive comparison both identifies the individual seeking access and also verifies that such individual is authorized to have access. This mode of operation works because the possible number combinations with, for example, eight or nine digits, is in the billions, so that even with a hundred or so individuals being authorized for access to cabinet 10, the likelihood of a spurious successful comparison is still infinitesimally low.

Regardless of the mode of operation, when there is a successful comparison in comparator 58, an output signal appears on line 60 which is applied to release lock 62. If the system also has a motor 20, the signal on line 60 may also be applied to motor 20 to cause the motor to operate in a direction to open the appropriate drawer or drawers of cabinet 18. Further, where the system has a timed relock feature, a timer 64 is provided which is reset by the signal on line 60.

When timer 64 times out, a signal appears on line 66 which is operative to relock lock 62. Where motor 20 is employed, the signal on line 66 is also applied to motor 20 to close the drawer before lock 62 engages. Where motor 20 is not provided, the relocking of lock 62 is inhibited if it is determined that drawer 18 is open. If desired, a local or remote audio alarm can be provided to alert the user than the drawer needs to be closed when a time-out occurs, or that the user needs to reenter his access code in order to reset the timer.

Figure 5:
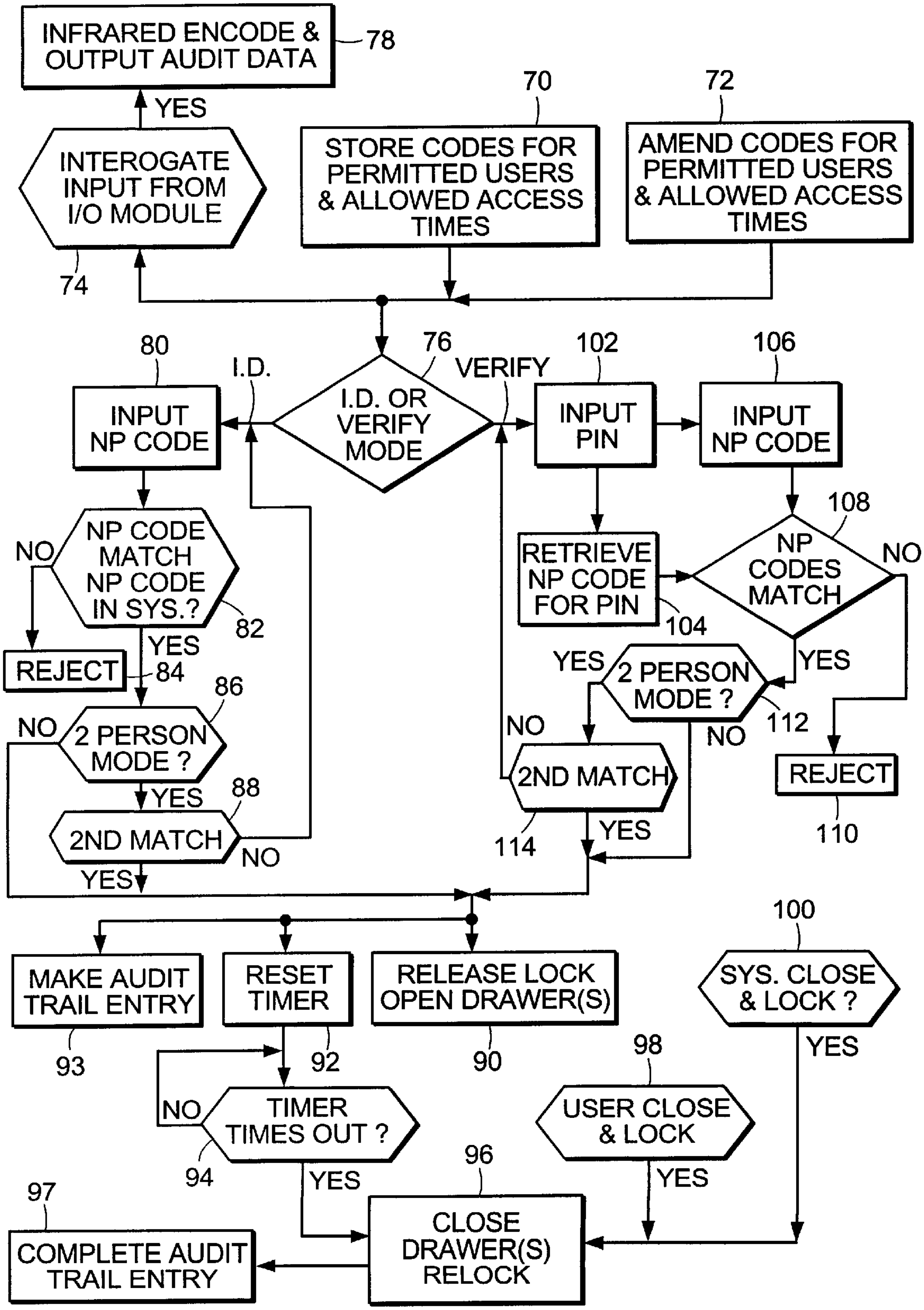
FIG. 5 is a flow diagram for utilization of the apparatus of FIG. 4.

FIG. 5 is a flow diagram illustrating operation of the system of FIG. 4 for various conditions. It should be appreciated that while a number of options are illustrated in FIG. 5, these options are for purposes of illustration only and that additional options, some of which are mentioned, are also possible.

Referring to FIG. 5, initially I/O module 40 is utilized to store codes in memory 54 of mechanism 12 (step 70) for permitted users and allowed access times. Thus, the system administrator, and perhaps a very limited number of other individuals in responsible positions, might have codes stored with an indication that such individuals may be granted access to the system at any time. Other individuals would also have their codes stored, but would have an indication stored that they could access the system only during a selected shift during normal work days, and not on weekends or holidays. Further, during step 72, I/O module 40 may be utilized to amend the information stored in memory 54. Such amendments may include adding or deleting individuals who are to be granted access to the system and changing the allowed access times for individuals already on the system. Other changes might include changes in the drawers 18 which an individual is to be granted access to, changes in the time-out time for relock, including an elimination of this time completely and an emergency override input, causing the system to close down and deny all accesses.

From steps 70 and 72, the system may proceed to either step 74 or 76. During step 74, an interrogate input is received from I/O module 40. In response to this input, processor 50 transfers at least selected audit trail data from memory 54 to infrared I/O unit 52. The infrared I/O unit encodes this information as a sequence of infrared light pulses which may be received and stored in I/O module 40. While the existence of the audit trail function and the capability of outputting this data are significant features of the invention, the specific way in which this function is accomplished, including either the use of an infrared I/O module or other suitable I/O technique, is conventional in the art and apparatus and methods conventional in the art may be utilized in accomplishing the specific encoding and outputting functions.

During step 76, a determination is made as to whether the system is in ID or verify mode. Typically, a locking mechanism 12 would operate in either one or the other of these modes and step 76 would, therefore, not be required. However, for purposes of illustration, it is assumed that the mechanism may operate in either mode.

Assuming initially that the mechanism is in ID mode, the operation proceeds to step 80 during which the user inputs the non-predictable code then appearing in display 32 of his user device 30. This inputting may be accomplished by use of input device 14, for example, a key pad on the outside of locking mechanism 12.

While for the preferred embodiment, the inputted non-predictable code is derived from a dynamically generated code appearing at token 30, this code would also be generated in other ways known in the art. One such way of generating a non-predictable code is query-response. Such systems typically input a secret or non-secret user ID and receive in return a query code which may be inputted to the token. The inputted query is then used in some way in an algorithm to generate the non-predictable code.

During step 82, the next step in the operation, the inputted non-predictable code is compared against each non-predictable code generated for the given time in the system until a match is obtained. Step 82 thus involves a sequence of sub-steps wherein the non-predictable codes generated for the authorized individuals and stored in memory 54 are retrieved in sequence and compared in comparator 58, or in processor 50 if a separate comparator 58 is not employed, against the stored inputted code. In order to avoid error, code values are not updated during the compare operation. After each comparison, if unsuccessful, a determination is made as to whether there are more stored non-predictable codes, and if there are, the next code is retrieved and the comparison operation repeated. This sequence of operations continues until either there is a successful comparison, in which case a YES output is obtained during step 82, or until an indication is received that there are no further stored non-predictable codes, in which case a NO output is received from step 82.

If a NO output is obtained during step 82, the operation proceeds to step 84 to reject the user. Since rejection may result from an erroneous input from the user, the user is generally permitted one additional attempt to gain access to the file cabinet or other container. Two successive rejections may result in the locking mechanism shutting down for some period of time or until reactivated by an input from a supervisory person.

It can also be appreciated that the clock in the user's device and the clock in the locking mechanism must remain in synchronization for the current codes to match. Since the user may have his device 30 for months or even years, it is possible for these clocks to get out of sync, resulting in spurious errors. The aforementioned U.S. Pat. No. 4,885,778 discusses a way in which this problem may be dealt with by generating codes for two or more adjacent time periods for each individual. The techniques of correcting for and maintaining synchronization between the user device clock and the clock of mechanism 12 taught in this patent may also be utilized in conjunction with the current invention.

Alternatively a hashed or encrypted representation of time could be merged with the non-predictable number by use of a suitable algorithm such as a binary algorithm, permitting the time at the user device to be retrieved at the locking mechanism, and making a separate synchronized clock at the locking mechanism unnecessary. To simplify the process, only hours and minutes could be transmitted, with day, month and year being generated at the locking mechanism. While such procedure might result in some synchronization errors at transitions, such errors are easily detected and corrected.

Typically, when a YES output is obtained during step 82, the operation proceeds to step 86. However, since there is a remote possibility that the same code could appear for two or more individuals, it is preferable that the comparison of the inputted code against all stored codes continue until all codes have been investigated, even if a match is detected. In the event such a procedure results in two matches, the user is instructed to reenter the code for a subsequent time period. The likelihood of the codes for two users being the same for two successive time periods is so infinitesimally low that this procedure should assure a unique identification of the user in all circumstances.

During step 86, a determination is made as to whether the system is operating in two-person/N-person mode. When the system is operating in two-person mode, this means that two people authorized to use the system must provide inputs which are recognized and accepted before unlocking occurs. With N-person mode, N authorized users must provide inputs. For the following discussion, two-person mode is assumed. Thus, if a YES output is obtained during step 86, the operation proceeds to step 88 to determine if the match just obtained is a second match. If a NO output is obtained during step 88, the operation returns to step 80, during which the second user inputs his non-predictable code. During step 82, this code is matched in the manner previously discussed with the non-predictable codes stored in the system. If the second code is rejected, then access is not granted, even though the first code was accepted. If a match is obtained with the second code, then the operation proceeds to step 86. With N-person mode, there would be additional iterations of this process.

While in the discussion above, it has been assumed that a comparison is made after each user enters his non-predictable code, it is also possible for the users to enter their codes in sequence and for the system to operate on the two codes together rather than separately. In this case, the length of field for comparator 58 is set for multiple authorized inputs. However, both for ease of computation and for superior security, it is considered preferable that the comparisons be performed sequentially.

If either a NO output is obtained during step 86, indicating that the locking mechanism is not in two-person mode, or a YES output is obtained during step 88, indicating that two matches have been obtained, the operation proceeds to step 90 to release lock 62 for the appropriate drawer or drawers 18. If a motor 20 is present, this also results in motor 20 being operated to open the appropriate drawer or drawers. If a timer 64 is present, the operation also proceeds to step 92 at this point to reset timer 64. The operation also proceeds at this time to step 93 to make an appropriate audit trail entry. Such an entry at this point might include the individual or individuals granted access, the time access is granted and, where appropriate, the drawer access is granted to. This completes the process of granting a user or users access to container 10.

Once access has been granted to one or more drawers of container 10, such access may be terminated in a number of ways, three of which are shown in FIG. 5. A first way is a determination during step 94 that timer 64 has timed out. A YES output during step 94 causes the operation to proceed to step 96 to close the drawer or drawers 18 which are open and to relock these drawers. Step 96 may also be entered through step 98 when a determination is made that the user has closed the drawer and has indicated that the drawer should be relocked by, for example, operating a suitable key or other control on input device 14. Finally, step 96 may be entered from step 100 in response to a system close and lock input which may occur when, for example, there has been a breach of security at the facility at which container 10 is located. An input for step 100 may be received by the locking mechanism through an I/O module 40 carried by a system administrator or other supervisory personnel, or locking mechanism 12 may be provided with a radio receiver or other suitable receiving device which responds to a suitable encoded system command. The system command may be a general command for all containers at the facility or may be addressed to the particular container in a manner to be described later in conjunction with FIG. 6. When step 96 is being performed, step 97 is also being performed to complete the audit entry started during step 93 by entering the time the access terminated and possibly the manner of termination.

Returning to step 76, if it is determined that lock mechanism 12 is in the verify mode, the operation branches to step 102 during which the user inputs his PIN. A PIN is a personal identification number which is preferably a secret number known only to the user. Other identification codes, either secret or non-secret could also be used.

From step 102, the operation proceeds to both steps 104 and 106. During step 104, the PIN is utilized by processor 50 to retrieve the current non-predictable code for the person having the given PIN. During step 106, the user inputs the non-predictable code appearing on his user device 30. During step 108, the retrieved non-predictable code is compared with the inputted non-predictable code. If these codes do not match, the operation branches to step 110 to reject the user. As for step 84, the user may be given one additional opportunity to gain access to container 10 before a lockout condition occurs.

If there is a successful comparison during step 108, the operation proceeds to step 112 to determine if the system is in two-person mode. If the system is in two-person mode, the operation proceeds to step 114 to determine if the match is the second match and returns to step 102 if there is a NO output from step 114. This permits the second user to input his PIN and non-predictable code. If a NO output is obtained during step 112 or a YES output is obtained during step 114, the operation proceeds to step 90 to release the lock and, if appropriate, open the drawers and, if appropriate, also proceeds to step 92 to reset the timer. The remainder of the operation, steps 93–100, are performed in the manner previously described.

The verify mode of operation described above is advantageous in that it provides two-factor security, namely, something the person knows (the PIN) and something the person has (user device or card 30); whereas the ID mode provides only single-factor security, namely, something the person has. However, the verify mode as described above may be disadvantageous in that a third party may be able to observe the user inputting his PIN, thereby comprising the security afforded by two factors.

One way around this problem is for the user to use keypad 34 to key his PIN into card 30 sometime before entering the room containing file cabinet 10. It is far easier to hold card 30 in a manner such as to avoid detection of the inputted PIN than it is with respect to keypad 14 of locking mechanism 12. The inputted PIN is then utilized in the processor of card 30 as one of the inputs for generating the non-predictable code. For example, the PIN may be mixed with a non-predictable code produced at the card to generate a resulting non-predictable code which may be inputted during step 80 of the ID mode or the PIN, with the unique seed or key, may be inputted to the algorithm. With this mode of operation, the stored or generated non-predictable codes also have the appropriate PIN mixed within or otherwise utilized to define them, so that comparisons are for a number which is a combination of non-predictable code and PIN. If an improper PIN is entered, a match will not be secured. Therefore, the advantages of two-factor security are obtained without the potential compromising of the PIN value. One technique for this mode of operation is discussed in greater detail in U.S. Pat. No. 5,023,908.

The system described above also has an additional potential problems which may compromise user satisfaction with the system. This is the fact that the user must key in 10 to 15 numbers in order to gain access to the cabinet. Since a user may need to gain access to several cabinets (for example, a desk, file cabinet, safe, or the like) at a particular facility, and since the device 30 may also be utilized to gain access to the facility itself, requiring a similar inputting of numbers, the procedure can become tedious.

U.S. Pat. Nos. 5,058,161 and 5,097,505 describes a potential solution to this problem wherein card 30 contains a relatively low power, battery operated transmitter which is either triggered by a beacon or other suitable means or which is continuously transmitting the current non-predictable code appearing on the device 30. Alternatively, the user may use the keypad 34 to key in a PIN in the manner described above for use in generating the non-predictable code, the keying in of the PIN causing card 30 to begin transmitting for some selected period of time. Each locking mechanism 12 contains a receiver which performs the inputting step, for example step 80, in response to the transmitted non-predictable code (which non-predictable code may incorporate or be dependent on the user PIN). Except for the difference in the inputting step described above, the locking mechanism operates in identical fashion for this mode of operation as for the modes previously described.

In the discussion above, mention has been made of maintaining an audit trail in memory 54 of accesses to file cabinet 10 and in particular to the drawers 18A and 18B thereof. As indicated above, this may be accomplished by providing step 93 after steps 90 and 92 during which a record is made of the individual accessing the container and the time at which such access occurred. Similarly, after step 96 is performed, step 97 is performed to record in the audit trail the time at which the access was completed. The audit trail may be maintained for cabinet 10 as a whole or, where each drawer 18 is individually accessible, the audit trail record may be maintained on a drawer-by-drawer basis. As discussed above in conjunction with steps 74 and 78, this information may be retrieved by I/O module 40 and may be then transferred from I/O module 40 to a main computer having a suitable memory for storing a more permanent audit trail record.

Figure 6:
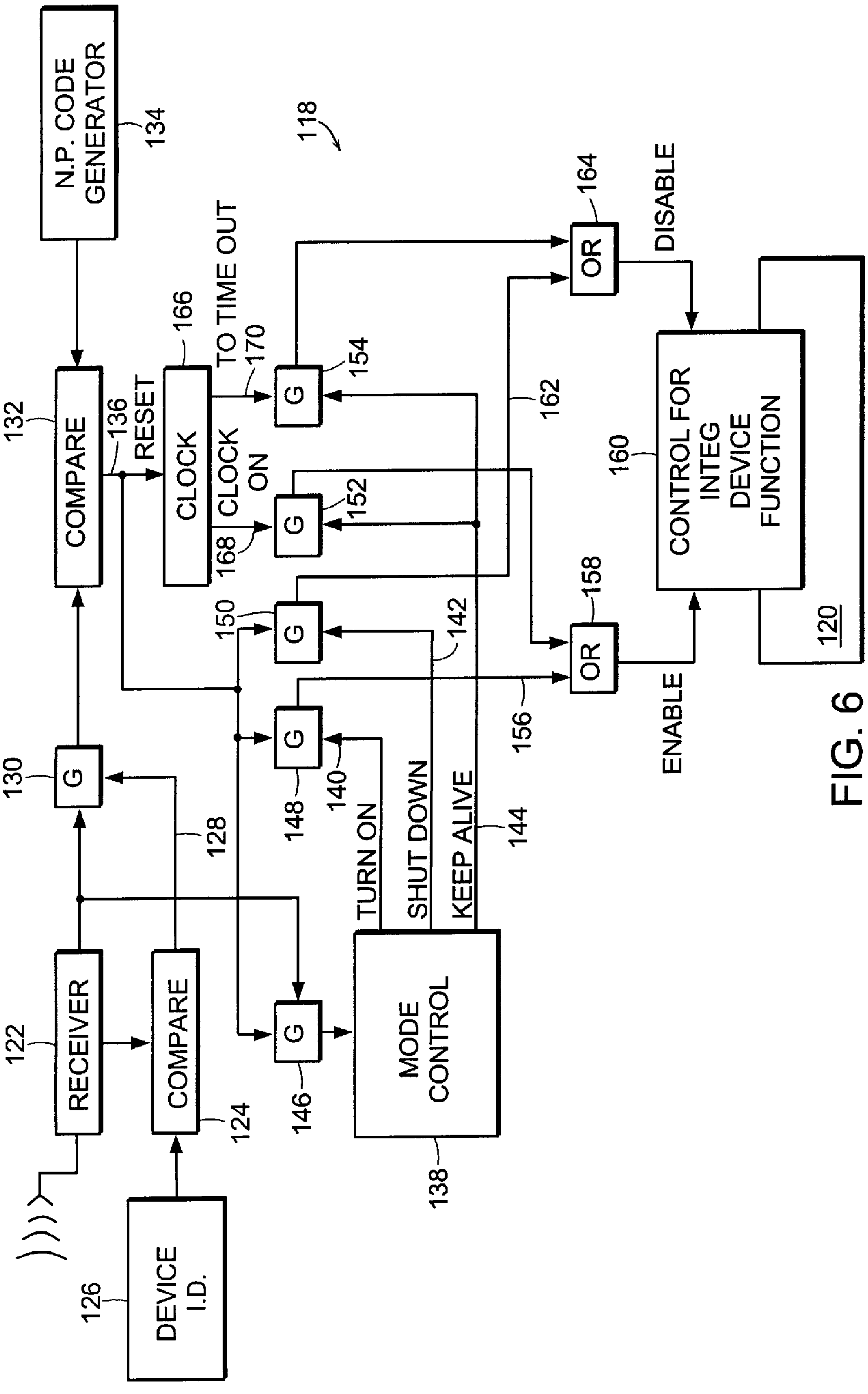
FIG. 6 is a schematic block diagram for an illustrative embodiment of the invention being utilized to control utilization of a given device.

FIG. 6 is a block diagram of a circuit 118 for an alternative embodiment of the invention which is utilized to control operation of a device 120 so that the device may not be utilized, either at all or in a meaningful way, if the device is stolen or otherwise misappropriated. In particular, the circuit of FIG. 6 may either permanently disable operation of device 120 or may cause the device to operate in a manner such that it does not generate useful results. For example, if the device is a radio or television, it may generate only static or snow. More important, if the device is a computer, it may have its memories erased so as to protect sensitive information. Alternatively, where it is desired that the thief not become aware of the fact that the device has become disabled, the computer programming for the device may be altered such that the device appears to be operating correctly, but is, in fact, generating erroneous and worthless results.

The circuit 118 includes a receiver 122 tuned to the frequency of a transmitter at, for example, a central control station, which, under appropriate circumstances to be subsequently described, generates a code for the particular device 120 followed by a multi-digit non-predictable code.

The signals being received by receiver 122 are continuously applied to a comparator 124, the other input to which is the identification code for device 120 stored in a register or other suitable memory 126. Nothing happens in circuit 118 until comparator 124 generates an output on line 128 indicating that an input for the device 120 is being received.

The signal on line 128 is applied as an enabling input to gate circuit 130, the information input to this gate being the output from receiver 122. Thus, when it is determined that the received input is for the device 120, the non-predictable code following the device ID is transmitted through enabled gate 130 to one input of compare circuit 132. The other input to compare circuit 132 is a current output from non-predictable code generator 134. Non-predictable code generator 134 operates in the same manner as the non-predictable code generator in device 30 previously described. If the time-varying non-predictable code received at receiver 122 matches the time-varying non-predictable code currently being generated at generator 134, comparator 132 generates an output on line 136 which is utilized in different ways depending on the mode in which the circuit is being operated.

The circuit of FIG. 6 may operate in one or more of three modes which will be referred to as the turn-on mode, the shut-down mode, and the keep-alive mode. In the turn-on mode, the device 120 does not operate unless a signal on line 136 is generated. This mode might, for example, be utilized to activate a beacon or other item useful for tracking and retrieving a stolen product. Alternatively, this mode may be useful to enable use of a rented product, for example, a cable box, when a cable fee has been paid. In a high security operation, it may even be utilized to enable a remotely located missile or the like. Two person security requiring the generation of two successive non-predictable codes from two separate user devices 30 (FIG. 2) might be required in such an application.

The second mode is the shutdown mode. In this mode, a device operates normally until a signal is received on line 136, at which point the device is disabled in a manner to be described shortly to either render the device useless or to render the results of using the device worthless in the manner previously described. This would be a typical mode of operation for protecting stolen property, particularly highly classified property from being stolen and/or misused. Where the code recognition toggles the state of the device, a first recognition might turn the device on and a second recognition turn the device off, or vica-versa.

The third mode of operation is the keep alive mode. One problem with the other two modes, and in particular the shut-down mode, is that in order to be effective, the device must be within the range of the transmitter being utilized and must not be effectively shielded from such transmitter. However, assuming the theft is not quickly detected, it is possible that a device may, in fact, be moved beyond the range of the transmitter or may be moved to a suitably shielded location so that it may not be effectively turned off. The keep alive mode deals with this problem in that each time a signal is received on line 136, a timer is reset. When the timer times out, the device is disabled in one of the manners previously described. Therefore, the device remains operative only if it is in a position to receive the non-predictable code. The timer interval can be set, depending on the degree of security required. In other applications, keep alive may be required in response to a use counter or to a more complicated accounting technique. Thus, for a given fee, a user might be permitted a number of uses, with an additional fee required to reincrement the use counter.

While a given device may operate in only a single mode, for purposes of illustration, the circuit of FIG. 6 is shown as being operable in the three modes described above. A mode control 138 is thus provided which generates an output at any given time on one of its three output lines, these lines being turn-on line 140, shut-down line 142, and keep-alive line 144. Mode control 138 is initially set for a particular mode, but may toggle as described above. For purposes of illustration, line 136 is shown as enabling a gate 146 to pass coded mode-select signals from receiver 122 which may be provided after the non-predictable code. These signals are passed by gate 146 to mode control 148 to effect changes in mode selection, if desired. Depending on the system, additional information may be transmitted and stored at a particular device, once it is enabled, including information as to authorized users, permitted times of use and the like.

Turn-on line 140 is connected as an enabling input to gate 148, shut-down line 142 is connected as an enabling input to gate 150, and keep-alive line 144 is connected as an enabling input to gates 152 and 154. Line 136 is connected as the information input to gates 148 and 150. When gate 148 is enabled by the signal on line 140, the gate passes the signal on line 136 through line 156 as one input to OR gate 158. The output from OR gate 158 is connected as an ENABLE input to a control chip 160, which chip is embedded in device 120 or is an integral part of device 120 (i.e. the control function is included in a chip performing other functions in device 120) and controls an integral function thereof. Chip 160 is designed such that any attempt to remove chip 160 or to otherwise tamper with it will cause either irreparable damage to device 120, for example, erasing all memories for a computer or irretrievably scrambling data stored therein or otherwise removing critical information from the chip which is essential to the proper operation of the device. The ENABLE input to control 160 turns the control device or chip on, thus enabling the functioning of device 120.

Similarly, when gate 150 is enabled by a shut-down signal on line 142 at the time a signal on line 136 is present, this signal is passed through gate 150 and line 162 to one input of OR gate 164. The output from OR gate 164 is connected to the DISABLE input of control chip 160. Thus, when the device is in shut-down mode, the receipt of a matched non-predictable code for the device causes control chip 160 to turn off or become disabled, thus disabling normal operation of device 120. The manner in which disabling may occur has been discussed previously.

The signal on line 136 is also applied as a reset input to clock 166. Clock 166 has a predetermined duration, after which it times out. When the clock is running, it generates an output on line 168 which is applied as one input to gate 152. When the clock times out, it generates an output on line 170 which is applied as one input to gate 154. In some applications a number-of-uses counter, a cumulative clock (i.e. a clock which is not reset for each new use), or other suitable control element may be used to generate the signals on lines 168 and 170.

Keep alive line 144 is the other input to gates 152 and 154. The output from gate 152 is connected as the second input to OR gate 158 and the output from gate 154 is connected as the other input to or gate 164. Thus, when the device is in keep alive mode, control chip 160, and thus device 120, are enabled, permitting the device to function normally when clock 166 is on. However, if a reset signal is not received within the duration of clock 166, the clock times out, causing control chip 160 and device 120 to become disabled.

One manner in which the circuit of FIG. 6 may be utilized is to permit a computer log-on to be completed as an authorized individual enters the room containing the computer so that, by the time the user sits down at the computer, he is fully logged on. This is accomplished through use of a user card or other ID token device 30 of the type previously described having some type of transmitter output, for example, an RF transmitter output. As a user approaches or enters a room, he enters his PIN into the card in the manner previously described. In this case, rather than comparing on a device ID, the comparison may occur on some synchronization code so that the input code stream from receiver 122 and the non-predictable code stream from generator 134 are synchronized when received at comparator 132. Further, the computer might operate only in turn on mode with the other modes not being available. The system would otherwise function as described above to log the user onto the system. Triggering of the transmitter may also occur in other ways; for example the detection of a coded or uncoded beacon may trigger the transmitter. With a coded beacon, the system operation is generally query response.

While the invention has been particularly shown and described above with reference to several preferred embodiments, the foregoing and other changes in form and detail may be made therein by one skilled in the art without departing from the spirit and scope of the invention.

What is claimed is:

1. A system for inhibiting unauthorized utilization of a protected device including keep-alive means having a selected keep-alive criteria, comprising;

control means connected as an integral part of said device which means may be in at least a first and a second state, said control means being connected to said device in a manner such that the control means may inhibit utilization of said device when the control means is in its first state and does not inhibit utilization of the device when the control means is in the second state;

a receiver for electromagnetic signals of a particular wavelength, said receiver being adapted to receive messages containing a device code and a dynamic non-predictable code selectively transmitted from a control source;

means responsive to a received device code for verifying that the message is for the device;

means responsive to a received non-predictable code for a verified message for determining that the message is an authorized message;

means responsive to an authorized message for controlling the state of said control means;

keep-alive means having a selected keep-alive criteria: means responsive to said means for verifying for resetting said keep-alive means; and means responsive to said keep-alive means satisfying the keep-alive criteria for switching said control means to the second state, the control means being switched to the first state by said means for controlling.

2. A system as claimed in claim 1 wherein said keep-alive means is a time-out means having a selected duration, the control means being switched to the first state when the time-out means times out.

* * * * *